(12) United States Patent
Ling

(10) Patent No.: US 11,071,921 B2
(45) Date of Patent: Jul. 27, 2021

(54) RIDE-ON TOY

(71) Applicant: Wonderides, Inc., Mercer Island, WA (US)

(72) Inventor: Tianfang Ling, Mercer Island, WA (US)

(73) Assignee: WONDERIDES, INC., Mercer Island, WA (US)

(*) Notice: Subject to any disclaimer, the term of this patent is extended or adjusted under 35 U.S.C. 154(b) by 484 days.

(21) Appl. No.: 15/985,138

(22) Filed: May 21, 2018

(65) Prior Publication Data

US 2019/0351338 A1 Nov. 21, 2019

(51) Int. Cl.
*B62K 9/00* (2006.01)
*A63H 17/38* (2006.01)
*A63H 17/26* (2006.01)
*A63G 19/14* (2006.01)
*A63H 33/30* (2006.01)

(52) U.S. Cl.
CPC ........... *A63G 19/14* (2013.01); *A63H 17/266* (2013.01); *A63H 17/38* (2013.01); *A63H 33/3033* (2013.01); *B62K 9/00* (2013.01)

(58) Field of Classification Search
CPC ........ A63G 19/10; A63G 19/12; A63G 19/14; A63H 17/266; A63H 17/38; A63H 33/3033; B62K 9/00
See application file for complete search history.

(56) References Cited

U.S. PATENT DOCUMENTS

| | | | | |
|---|---|---|---|---|
| 5,301,969 A | * | 4/1994 | Bynoe | B62M 1/20 280/221 |
| 6,431,943 B1 | * | 8/2002 | Rehkemper | A63H 17/16 446/440 |
| 6,595,539 B1 | * | 7/2003 | Belli | B62K 15/008 280/278 |
| 9,387,903 B2 | * | 7/2016 | O'Connell | B62K 19/18 |
| 2005/0245365 A1 | * | 11/2005 | Rolli | A63B 23/0227 482/92 |
| 2011/0193313 A1 | * | 8/2011 | Yun | B62K 15/008 280/278 |
| 2020/0255085 A1 | * | 8/2020 | Zhang | C22C 38/04 |

* cited by examiner

*Primary Examiner* — Jacob D Knutson
(74) *Attorney, Agent, or Firm* — Hauptman Ham, LLP

(57) ABSTRACT

A ride-on toy includes a handle unit; a front leg unit including a front leg and a front wheel mounted to the front leg; a rear leg unit including a rear leg and a rear wheel mounted to the rear leg; a pedal unit; a saddle unit; and a chassis. In a first state, in response to a first downward force applied to the saddle unit and a forward force applied to the handle unit, the front leg moves with the front wheel forward and away from the rear leg, and the rear leg stays still. In a second state, in response to a second downward force applied to the pedal unit and a rearward force applied to the handle unit, the rear leg moves with the rear wheel forward and toward the front leg, and the front leg stays still.

21 Claims, 12 Drawing Sheets

RIDE-ON TOY

RELATED APPLICATIONS

The following U.S. Applications are related to the instant application and are incorporated by reference herein:
   U.S. patent application titled "One-Way Rotating Device," application Ser. No. 15/986,264, filed on May 22, 2018, invented by Tianfang LING; and
   U.S. patent application titled "Steering Device," application Ser. No. 15/990,040, filed on May 25, 2018, invented by Tianfang LING.

TECHNICAL FIELD

The present disclosure relates to a ride-on toy and ride-on amusement facility, and more particularly, to a human power ride-on toy.

BACKGROUND

Ride-on toys or ride-on amusement facilities according to other approaches may not be able to simulate a horse's action as riding a real horse, and/or allow the rider to enjoy a real horse riding experience. Therefore, ride-on toys or ride-on amusement facilities according to other approaches may make the rider feel tedious about the riding action. Thus, the inventor(s) propose(s) a ride-on toy or a ride-on amusement facility, which in some embodiments can vividly and lively simulate the "horse riding" action, and when riding the toy, the rider can simulate the image and feel close to the real "horse riding" experience, so that the rider can get fun from the riding, and the bystanders feel a wonderful entertainment effect. At the same time, the rider can also achieve a comprehensive fitness effect.

BRIEF DESCRIPTION OF THE DRAWINGS

One or more embodiments are illustrated by way of example, and not by limitation, in the figures of the accompanying drawings, wherein elements having the same reference numeral designations represent like elements throughout.

DETAILED DESCRIPTION

Figure 1:
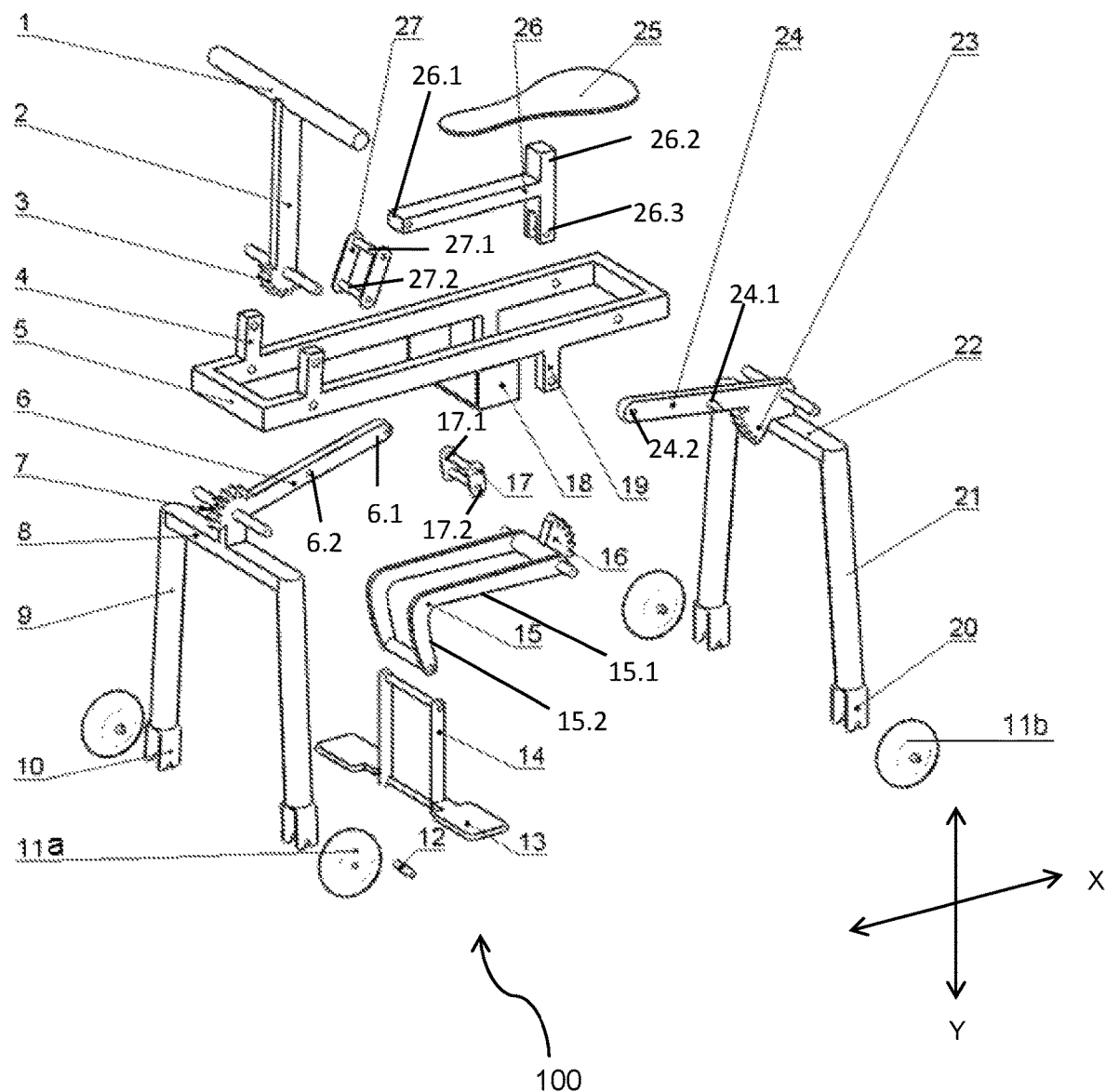
FIG. 1 is an exploded view of a ride-on toy according to a first embodiment.

The disclosure herein provides many different embodiments, or examples, for implementing different features of the disclosed subject matter. Specific examples of components and arrangements are described below to simplify the present disclosure. These are examples and are not intended to be limiting.

This description of the various embodiments is intended to be read in connection with the accompanying drawings, which are to be considered part of the entire written description. In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" and "interconnected," refer to a relationship wherein components are attached to one another either directly or indirectly through intervening components, unless expressly described otherwise. In the following description, "fixedly connected to each other" or "fixed to each other' means to connect two elements to each other such that the connected elements move together and do not move relative to each other.

Figure 2:
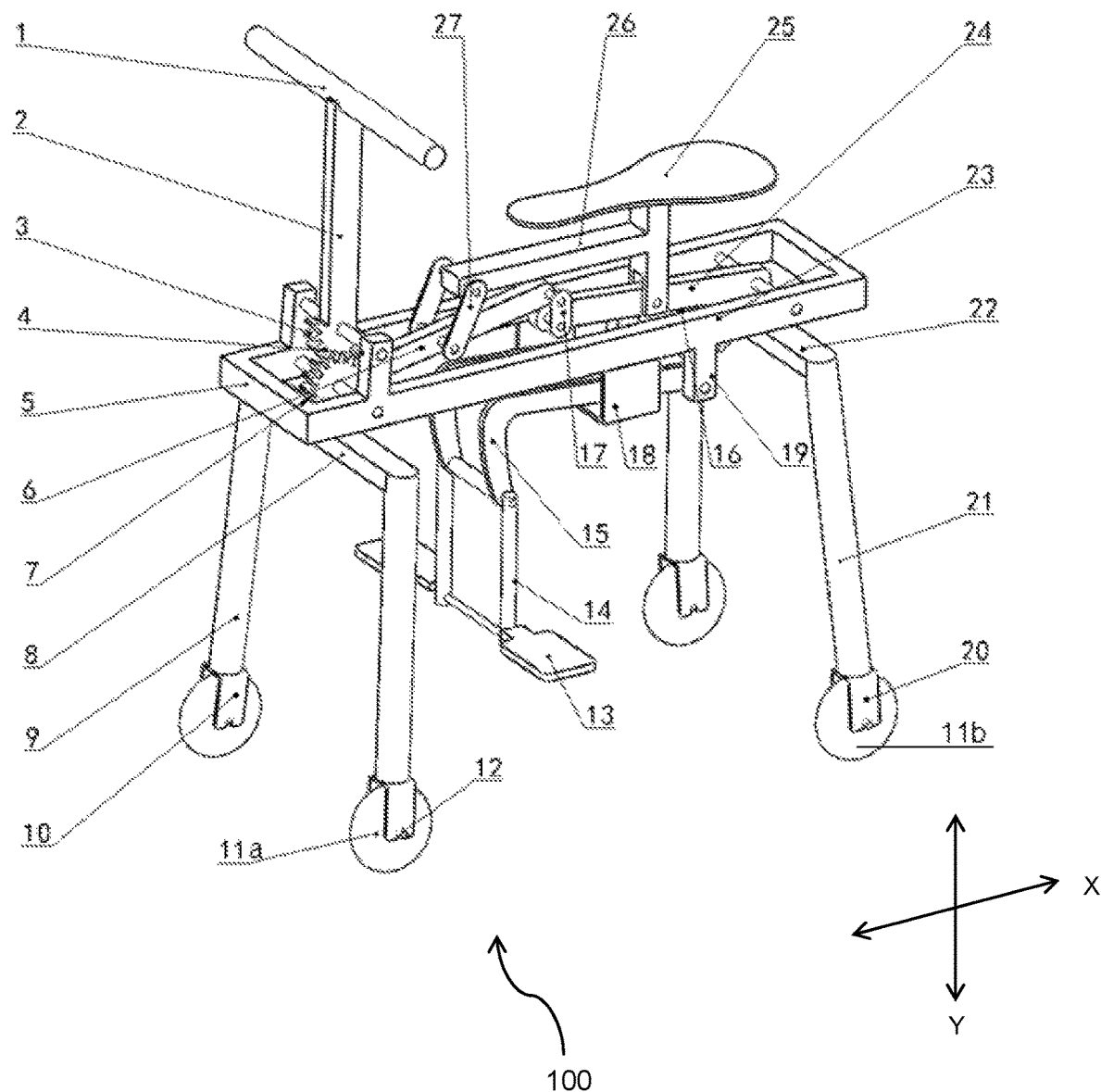
FIG. 2 is a perspective view of the ride-on toy in an assembled state, according to the first embodiment.

According to the embodiment(s) described herein, it is possible for a ride-on toy to vividly and lively simulate the "horse riding" action. In other words, when riding the toy, the rider can simulate a real "horse riding" action and have a feeling of riding a real horse. FIGS. 1-2 illustrate a first embodiment of a ride-on toy 100 having a front-rear direction X and an up-down direction Y.

Referring to FIGS. 1-2, the ride-on toy 100 includes a handle 1, a handle push-pull rod 2, and a handle gear 3. The handle 1, the handle push-pull rod 2, and the handle gear 3 are fixed to each other to form a handle unit. In other words, the handle 1, the handle push-pull rod 2, and the handle gear 3 do not move relative to each other. As shown in FIG. 1, the handle push-pull rod 2 has one end fixed to a middle portion of the handle 1 and another end forming the handle gear 3. When the ride-on toy 100 is in use, the rider can put his/her hands on the handle 1 to push and/or pull the handle away or toward his/her body.

The ride-on toy 100 further includes a chassis 5. The chassis 5 can be formed in different shapes, for example, the chassis 5 is formed in a rectangular shape elongated in the front-rear direction according to the first embodiment. The chassis 5 includes upper and lower surfaces opposite to each other in the up-down direction. A push-pull rod bracket 4 is fixed onto the upper surface of the chassis 5 to movably connect the handle unit to the chassis 5. Further, a limit stop bracket 18 and a pedal push-pull bracket 19 are arranged side by side in the front-rear direction and are fixed onto the lower surface of chassis 5. The limit stop bracket 18 and the pedal push-pull bracket 19 will be described in details later.

The ride-on toy 100 further includes a front leg unit including a front leg push-pull rod 6, a front leg gear 7, a front leg bracket 8, a pair of front legs 9, a pair of front leg wheel brackets 10, and a pair of front leg wheels 11a. The front leg push-pull rod 6 is fixed to a middle portion of the front leg bracket 8 which is fixedly connected to the pair of front legs 9. The front leg gear 7 is formed at the front leg push-pull rod 6 and engages with the handle gear 3. According to the first embodiment, the front leg push-pull rod 6, the front leg gear 7, the front leg bracket 8, and the pair of front legs 9 are fixed to each other. In other words, the front leg push-pull rod 6, the front leg gear 7, the front leg bracket 8, and the pair of front legs 9 do not move relative to each other.

Each front leg wheel 11a of the pair of front leg wheels 11a is a single-way wheel which is connected to the front leg wheel bracket 10 via a single-way wheel axis 12 and which is configured to rotate in only one direction. In some embodiments, at least one of the wheels 11a is a one-way rotating device as described in US patent application titled "One-Way Rotating Device," Ser. No. 15/986,264, invented by Tianfang LING, which application is incorporated by reference herein. In some embodiments, the front leg wheels 11a are formed by assembling stop mechanisms, such as stop rings and/or ratchets, on double-way wheels or universal wheels (which would otherwise be rotatable in opposite directions) so as to cause the double-way wheels or universal wheels to rotate in one direction only. According to the first embodiment, each front leg wheel 11a of the pair of front leg wheels 11a is configured to rotate forward only.

The ride-on toy 100 further includes a rear leg unit including a rear leg push-pull rod 24, a rear leg gear 23, a rear leg bracket 22, a pair of rear legs 21, a pair of rear leg wheel brackets 20, and a pair of rear leg wheels 11b. The rear leg push-pull rod 24 is fixed to a middle portion of the rear leg bracket 22 which is fixedly connected to the pair of rear legs 21. The rear leg gear 23 is formed at the rear leg push-pull rod 24 and engages with a pedal gear 16 of a pedal unit. According to the first embodiment, the rear leg push-pull rod 24, the rear leg gear 23, the rear leg bracket 22, and the pair of rear legs 21 are fixed to each other. In other words, the rear leg push-pull rod 24, the rear leg gear 23, the rear leg bracket 22, and the pair of rear legs 21 do not move relative to each other.

Each rear leg wheel 11b of the pair of rear leg wheels 11b is a single-way wheel which is connected to the rear leg wheel bracket 20 via a single-way wheel axis and which is configured to rotate in only one direction. In some embodiments, at least one of the wheels 11b is a one-way rotating device as described in US patent application titled "One-Way Rotating Device," Ser. No. 15/986,264, invented by Tianfang LING, which application is incorporated by reference herein. In some embodiments, the rear leg wheels 11b are formed by assembling stop mechanisms, such as stop rings and/or ratchets, on double-way wheels or universal wheels (which would otherwise be rotatable in opposite directions) so as to cause the double-way wheels or universal wheels to rotate in one direction only. According to the first embodiment, each rear leg wheel 11b of the pair of rear leg wheels 11b is configured to rotate forward only.

The ride-on toy 100 further includes a saddle unit. The saddle unit includes a saddle 25 adapted to be sit on by a rider and a saddle bracket 26 fixed to the saddle 25 from below. The saddle bracket 26 is formed in a sideway T-shape which has a first end 26.1 rotatably connected to the front leg push-pull rod 6 via a saddle-front leg connection block 27, a second end 26.2 fixedly connected to the saddle 25, and a third end 26.3 fixedly connected to a middle portion 24.1 of the rear leg push-pull rod 24. The first end 26.1 of the saddle bracket 26 is rotatably connected to a first end 27.1 of the saddle-front leg connection block 27.

The front leg push-pull rod 6 is movably connected to the saddle bracket 26 via the saddle-front connection block 27 and movably connected to the rear leg push-pull rod 24 via a front leg-rear leg connection block 17. A first end 6.1 of the front leg push-pull rod 6 is movably connected to a first end 17.1 of the front leg-rear leg connection block 17, and a middle portion 6.2 of the front leg push-pull rod 6 is movably connected to a second end 27.2 of the saddle-front leg connection block 27. An end 24.2 of the rear leg push-pull rod 24 is movably connected to a second end 17.2 of the front leg-rear leg connection block 17.

The ride-on toy 100 further includes a pedal unit. The pedal unit includes a pedal 13, a pedal bracket 14, a pedal push-pull rod 15, and a pedal gear 16. According to the first embodiment, the pedal 13 and the pedal bracket 14 are fixed to each other, and the pedal push-pull rod 15 and the pedal gear 16 are fixed to each other. In other words, the pedal 13 and the pedal bracket 14 do not move relative to each other, and the pedal push-pull rod 15 and the pedal gear 16 do not move relative to each other. The pedal gear 16 engages with the rear leg gear 23 to connect the rear leg unit and the pedal unit. The pedal push-pull rod 15 is formed in an L shape, which includes a longer portion 15.1 disposed above the limit stop bracket 18 and a shorter portion 15.2 extending downwardly from the longer portion 15.1 to connect the pedal bracket 14. The longer portion of the pedal push-pull rod 15 has an end fixed to the pedal gear 16.

Figure 3:
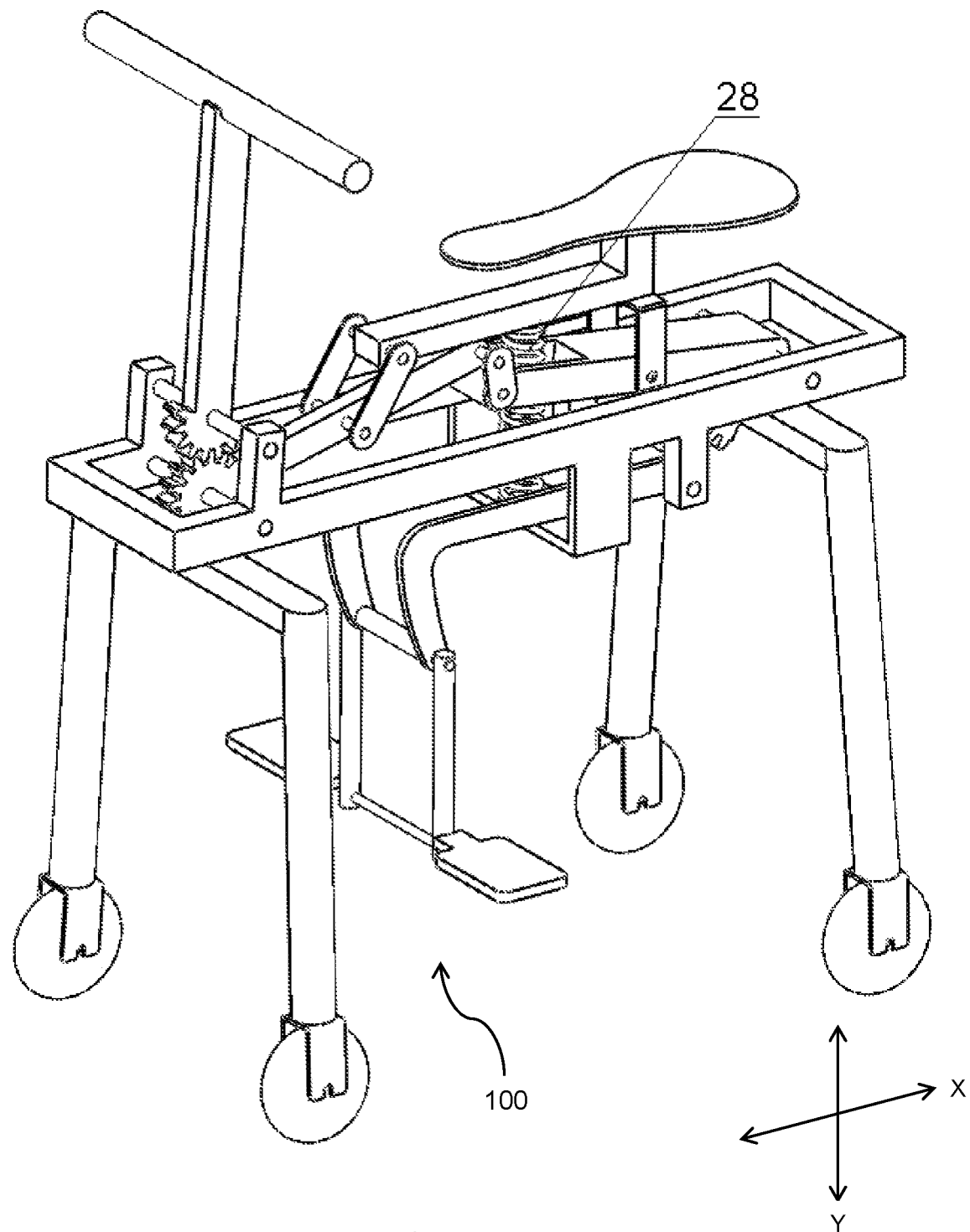
FIG. 3 is a perspective view of the ride-on toy with a spring in an assembled state, according to the first embodiment.

In the embodiment depicted in FIG. 3, the saddle unit of the ride-on toy 100 further includes a spring 28 disposed between the saddle bracket 26 and the limit stop bracket 18. When a downward force is applied to the saddle 25 and a forward force is applied to the handle 1, the pair of front legs 9 moves forward and away from the pair of rear legs 21. When the pair of front legs 9 moves forward to a position where the pair of front legs 9 are separated away from the pair of rear legs 21 at a maximum distance, the spring 28 applies a maximum urging force to the saddle bracket 26 and the limit stop bracket 18. When a downward force is applied to the pedal 13 and a rearward force is applied to the handle 1, the pair of rear legs 21 gradually moves toward the pair of front legs 9 and the urging force applied by the spring 28 is gradually reduced such that the chassis 5 moves to bounce the saddle 25 upward. Due to the spring 28, the rider can enjoy a smoother moving experience when riding on the ride-on toy 100.

According to the first embodiment as described above, the pedal push-pull rod 15 extends through the limit stop bracket 18 and movably connected to the pedal push-pull rod bracket 19. The meshed engagement of the handle gear 3 and the front leg gear 7 constitutes a forward drive of the ride-on toy 100, and the meshed engagement of the pedal gear 16 and rear leg gear 23 constitutes a rearward drive of the ride-on toy 100.

Figure 4:
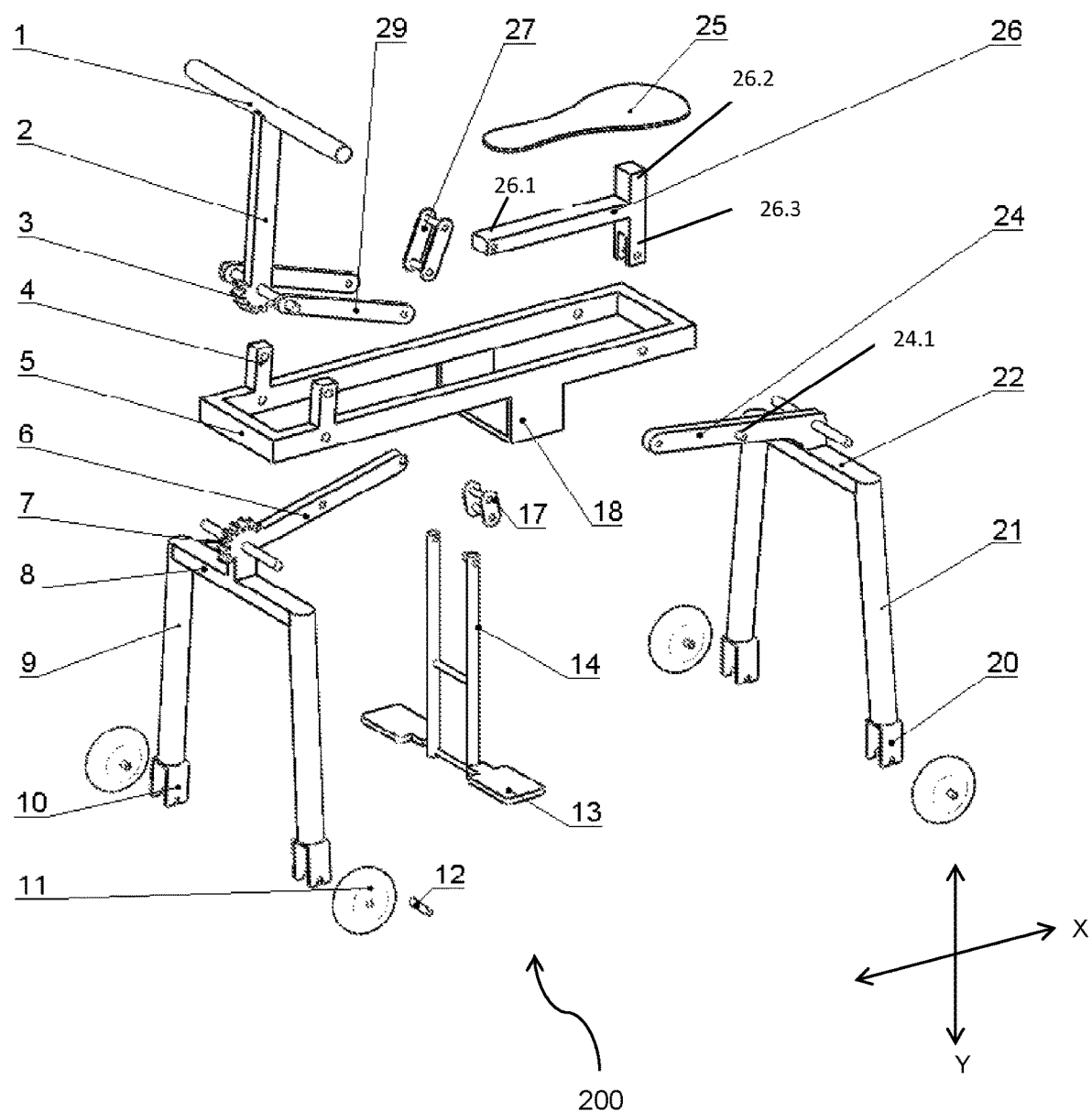
FIG. 4 is an exploded view of a ride-on toy according to a second embodiment.
Figure 5:
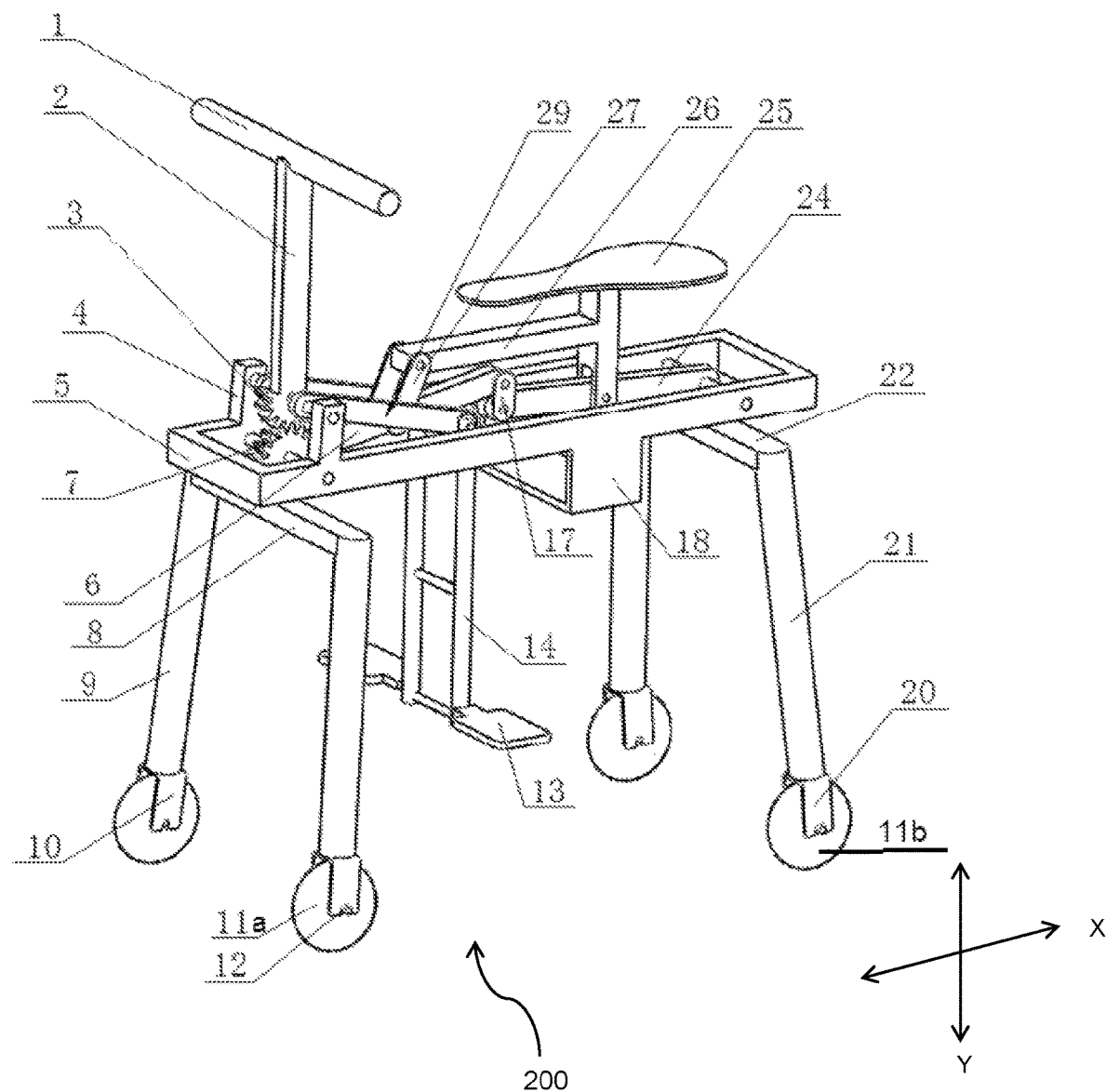
FIG. 5 is a perspective view of the ride-on toy in an assembled state, according to the second embodiment.
Figure 6:
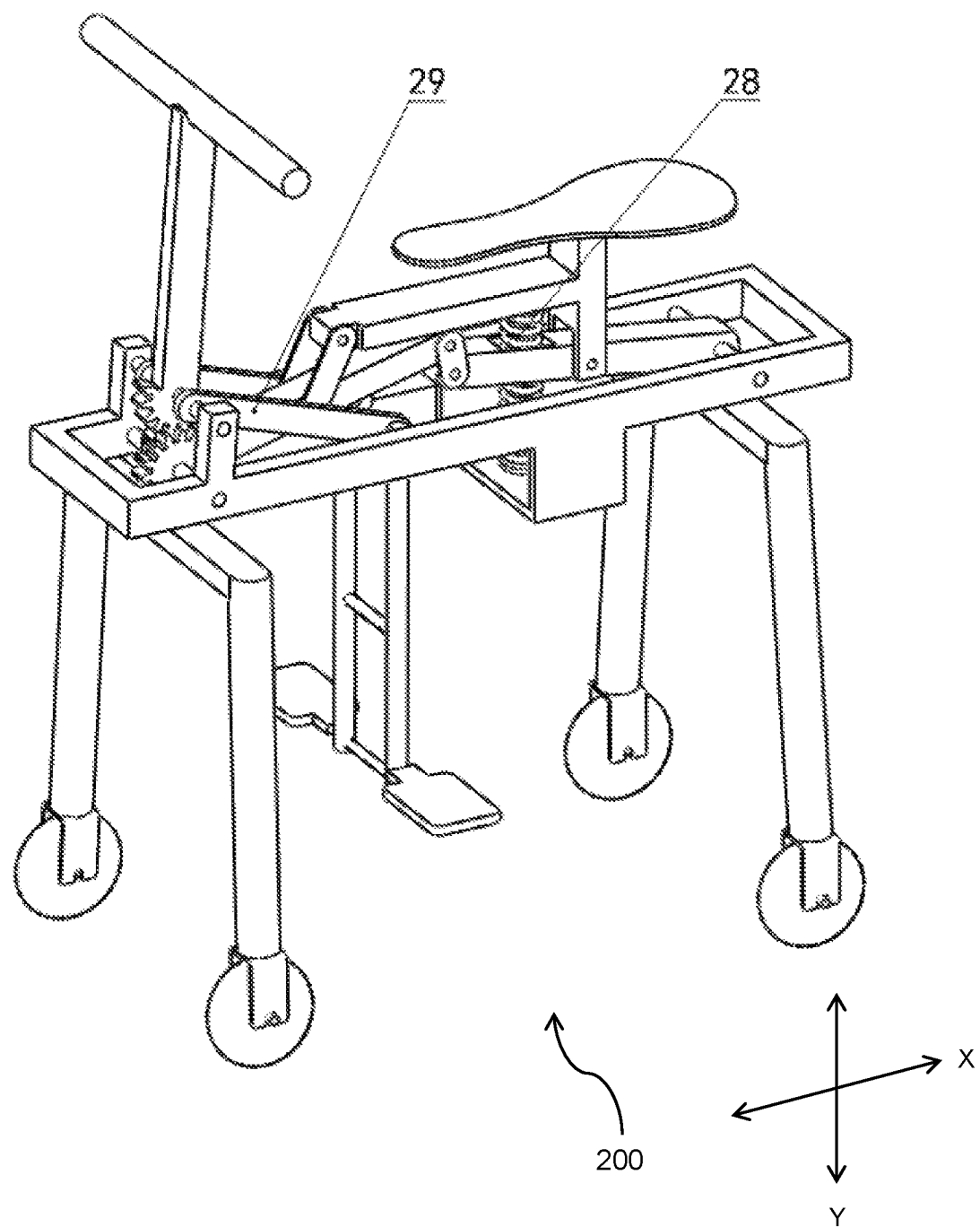
FIG. 6 is a perspective view of the ride-on toy with a spring in an assembled state, according to the second embodiment.

FIGS. 4-6 depict a second embodiment of a ride-on toy 200 having a front-rear direction X and an up-down direction Y.

Referring to FIGS. 4-5, the ride-on toy 200 includes a handle 1, a handle push-pull rod 2, a handle gear 3, and a pair of drive connection rods 29. The pair of drive connection rods 29 is mounted to two opposite sides of the handle push-pull rod 2. The handle push-pull rod 2 has one end fixed to a middle portion of the handle 1 and another end formed with the handle gear 3. According to the second embodiment, the handle 1, the handle push-pull rod 2, the handle gear 3, and the pair of drive connection rods 29 are fixed to each other to form a handle unit. In other words, the handle 1, the handle push-pull rod 2, the handle gear 3, and the pair of drive connection rods 29 do not move relative to each other. When the ride-on toy 200 is in use, the rider can put his/her hands on the handle 1 to push and/or pull the handle away or toward his/her body.

The ride-on toy 200 further includes a chassis 5. The chassis 5 can be formed in different shapes, for example, the chassis 5 is formed in a rectangular shape elongated in the front-rear direction according to the second embodiment. The chassis 5 includes upper and lower surfaces opposite to each other in the up-down direction. A push-pull rod bracket 4 is fixed onto the upper surface of the chassis 5 to movably connect the handle unit to the chassis 5. Further, a limit stop bracket 18 is fixed onto the lower surface of chassis 5.

The ride-on toy 200 further includes a front leg unit including a front leg push-pull rod 6, a front leg gear 7, a front leg bracket 8, a pair of front legs 9, a pair of front leg wheel brackets 10, and a pair of front leg wheels 11a. The front leg push-pull rod 6 is fixed to a middle portion of the front leg bracket 8 which is fixedly connected to the pair of front legs 9. The front leg gear 7 is formed at the front leg push-pull rod 6 and engages with the handle gear 3. According to the second embodiment, the front leg push-pull rod 6, the front leg gear 7, the front leg bracket 8, and the pair of front legs 9 are fixed to each other. In other words, the front leg push-pull rod 6, the front leg gear 7, the front leg bracket 8, and the pair of front legs 9 do not move relative to each other.

Each front leg wheel 11a of the pair of front leg wheels 11a is a single-way wheel which is connected to the front leg wheel bracket 10 via a single-way wheel axis 12 and which is configured to rotate in only one direction. In some embodiments, the front leg wheels 11a can be formed by assembling stop mechanisms, such as stop rings and/or ratchets, on double-way wheels or universal wheels (which would otherwise be rotatable in opposite directions) so as to cause the double-way wheels or universal wheels to rotate in one direction only. According to the second embodiment, each front leg wheel 11a of the pair of front leg wheels 11a is configured to rotate forward only.

The ride-on toy 200 further includes a rear leg unit including a pair of rear legs 21, a rear leg bracket 22, a rear leg push-pull rod 24, a pair of rear leg wheel brackets 20, and a pair of rear leg wheels 11b. According to the second embodiment, the pair of rear leg wheel brackets 20, the pair of rear legs 21, the rear leg bracket 22, and the rear leg push-pull rod 24 are fixed to each other. In other words, the pair of rear leg wheel brackets 20, the pair of rear legs 21, the rear leg bracket 22, and the rear leg push-pull rod 24 do not move relative to each other.

Each rear leg wheel 11b of the pair of rear leg wheels 11b is a single-way wheel which is connected to the rear leg wheel bracket 20 via a single-way wheel axis and which is configured to rotate in only one direction. In some embodiments, the rear leg wheels 11b are formed by assembling stop mechanisms, such as stop rings and/or ratchets, on double-way wheels or universal wheels (which would otherwise be rotatable in opposite directions) so as to cause the double-way wheels or universal wheels to rotate in one direction only. According to the second embodiment, each rear leg wheel 11b of the pair of rear leg wheels 11b is configured to rotate forward only.

The ride-on toy 200 further includes a saddle unit. The saddle unit includes a saddle 25 adapted to be sit on by a rider and a saddle bracket 26 fixed to the saddle 25 from below. The saddle bracket 26 is formed in a sideway T-shape which has a first end rotatably connected to the front leg push-pull rod 6 via a saddle-front connection block 27, a second end fixedly connected to the saddle 25, and a third end fixedly connected to the rear leg push-pull rod 24.

The front leg push-pull rod 6 is movably connected to the saddle bracket 26 via the saddle-front connection block 27 and movably connected to the rear leg push-pull rod 24 via a front leg-rear leg connection block 17.

The ride-on toy 200 further includes a pedal unit having a pedal 13 and a pedal bracket 14. According to the second embodiment, the pedal 13 and the pedal bracket 14 are fixed to each other. In other words, the pedal 13 and the pedal bracket 14 do not move relative to each other. The pedal bracket 14 is movably connected to the pair of drive connection rods 29 of the handle unit.

In FIG. 6, the saddle unit of the ride-on toy 200 further includes a spring 28 disposed between the saddle bracket 26 and the limit stop bracket 18. When a downward force is applied to the saddle 25 and a forward force is applied to the handle 1, the pair of front legs 9 moves forward and away from the pair of rear legs 21. When the pair of front legs 9 moves forward to a position where the pair of front legs 9 are separated away from the pair of rear legs 21 at a maximum distance, the spring 28 applies a maximum urging force to the saddle bracket 26 and the limit stop bracket 18. When a downward force is applied to the pedal 13 and a rearward force is applied to the handle 1, the pair of rear legs 21 gradually moves forward and toward the pair of front legs 9 and the urging force applied by the spring 28 is gradually reduced such that the chassis 5 moves to bounce the saddle 25 upward. Due to the spring 28, the rider can enjoy a smoother moving experience when riding on the ride-on toy 200.

According to the second embodiment described above, the mesh structure of the handle gear 3 and the front leg gear 7 constitutes the forward drive of the ride-on toy 200.

Figure 7:
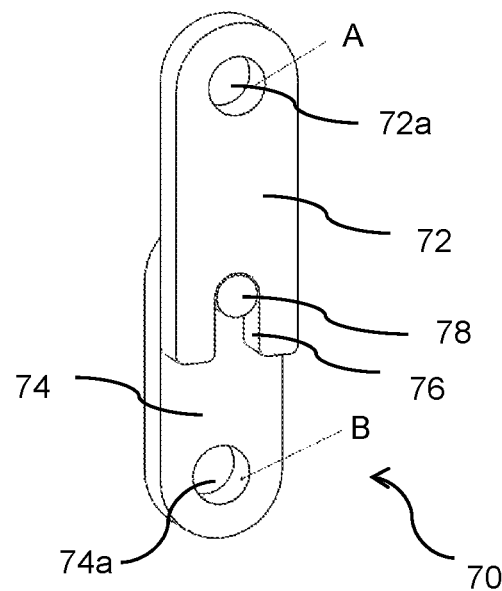
FIG. 7 is a perspective view that shows an example of an open shift fork connection structure.

FIG. 7 shows an example of an open shift fork connection structure 70. The open shift fork structure 70 includes a first rotatable plate 72 having a first hole 72a at a position A, and a second rotatable plate 74 having a second hole 74a at a position B. Further, the first rotatable plate 72 has an open slot 76 opposite to the first hole 72a. A pin 78 is disposed in the open slot 76 to connect the first and second rotatable plates 72 and 74 together.

The first and second rotatable plates 72 and 74 are rotatable about the positions A and B, respectively. When one of the first and second rotatable plates 72 and 74 rotates about the corresponding position in one direction, the other of the first and second rotatable plates 72 and 74 will be rotated in an opposite direction. For example, when the first rotatable plate 72 rotates about the position A in a clockwise direction, the pin 78 moves upward with the first rotatable plate 72 and the second rotatable plate 74 rotates about the position B in a counter clockwise direction.

In one embodiment, the open shift fork connection structure 70 can replace the front connection of the handle gear 3 and the front leg gear 7 in the ride-on toy 100 of the first embodiment or ride-on toy 200 of the second embodiment.

For example, referring to FIGS. 1 and 7, the first rotatable plate 72 can be fixedly connected to the front leg push-pull rod 6 of the handle unit via the first hole 72a at position A, and the second rotatable plate 74 can be fixedly connected to the front leg push-pull rod 6 of the front leg unit via the second hole 74a at position B.

Figure 8:
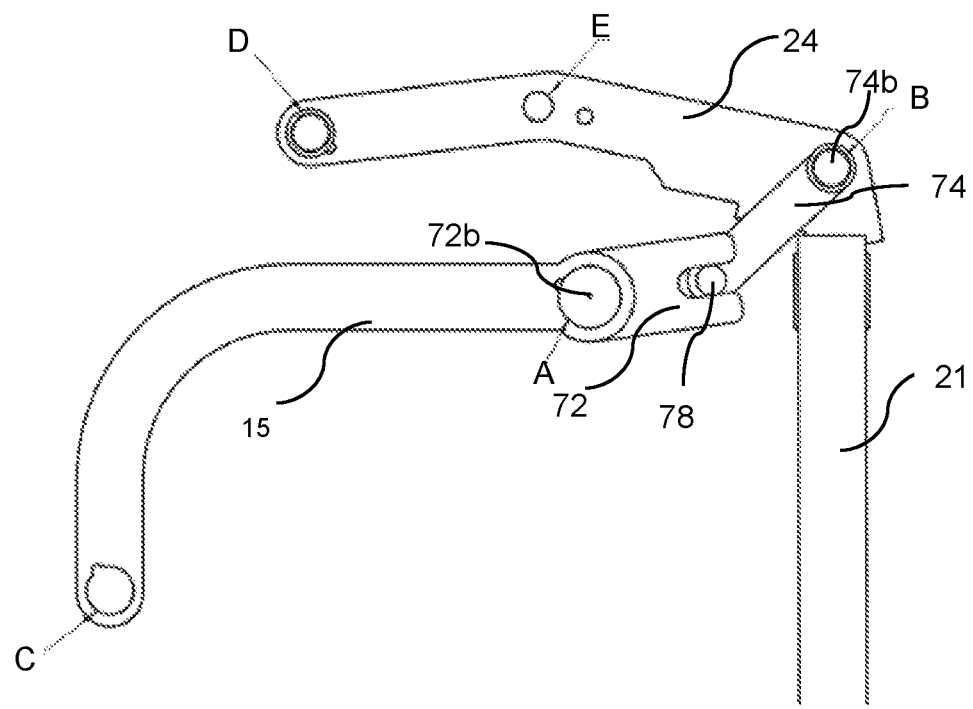
FIG. 8 is a side view that shows the open shift fork connection structure in the ride-on toy according to the first embodiment.

FIG. 8 shows the open shift fork connection structure 70 in the ride-on toy according to the first embodiment. According to the embodiment of FIG. 8, the open shift fork connection structure 70 replaces the rear connection of the pedal gear 16 and the rear leg gear 23 in the ride-on toy 100 of the first embodiment. As illustrated in FIG. 8, the first rotatable plate 72 is fixedly connected to the pedal push-pull rod 15 at the position A, and the second rotatable plate 74 is fixedly connected to the rear leg push-pull rod 24 at the position B. The rear leg push-pull rod 24 is fixedly connected to the rear leg 21. Further, a first pin 72b extends through the first hole 72a at the position A, and a second pin 74b extends through the second hole 74a at the position B.

Referring to FIG. 8, when the rear leg push-pull rod 24 is pushed by a downward force at positions D and E transferred from the handle 1 and the saddle 25, the rear leg 21 fixed to the rear leg push-pull rod 24 rotates about the second pin 74b at the position B in a counter clockwise direction. In other words, the rear leg 21 moves away from the front leg 9. At the same time, the second plate 74 pushes the first plate 72 downward via the pin 78 to cause the pedal push-pull rod 15 to rotate about the second pin 72b at the position A in a clockwise direction. Therefore, the position C where the pedal push-pull rod 15 is connected to the pedal bracket 14 is moved upward such that the pedal 13 is moved upward to provide an upward force to the rider's feet.

Further referring to FIG. 8, when the position C where the pedal push-pull rod 15 is connected to the pedal bracket 14 is moved by a downward force transferred from the pedal 13, the pedal push-pull rod 15 fixed to the first rotatable plate 72 rotates about the first pin 72b at the position A in the counter clockwise direction. At the same time, the first plate 72 pushes the second plate 74 upward via the pin 78 to cause the rear leg 21 to rotate about the second pin 74b at the position B in the clockwise direction. In other words, the rear leg 21 moves toward the front leg 9.

Figure 9:
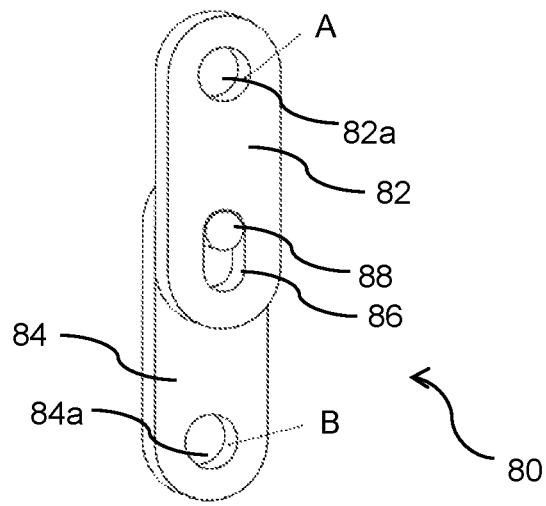
FIG. 9 is a perspective view that shows an example of a closed shift fork connection structure.

FIG. 9 shows an example of a closed shift fork connection structure 80. The closed shift fork structure 80 includes a first rotatable plate 82 having a first hole 82a, and a second rotatable plate 84 having a second hole 84a. Further, the first rotatable plate 82 has a closed slot 86 opposite to the first hole 82a. A pin 88 is movable in the closed slot 86 to connect the first and second rotatable plates 82 and 84 together.

The first and second rotatable plates 82 and 84 are rotatable about the positions A and B, respectively. When one of the first and second rotatable plates 82 and 84 rotates about the corresponding position in one direction, the other of the first and second rotatable plates 82 and 84 will be rotated in an opposite direction. For example, when the first rotatable plate 82 rotates about the position A in a clockwise direction, the pin 88 moves upward with the first rotatable plate 82 to cause the second rotatable plate 84 to rotates about the position B in a counter clockwise direction.

In one embodiment, the closed shift fork connection structure 80 can replace the front connection of the handle gear 3 and the front leg gear 7 in the ride-on toy 100 of the first embodiment or ride-on toy 200 of the second embodiment. For example, referring to FIGS. 1 and 7, the first rotatable plate 82 can be fixedly connected to the front leg push-pull rod 6 of the handle unit via the first hole 82a at position A, and the second rotatable plate 84 can be fixedly connected to the front leg push-pull rod 6 of the front leg unit via the second hole 84a at position B.

Figure 10:
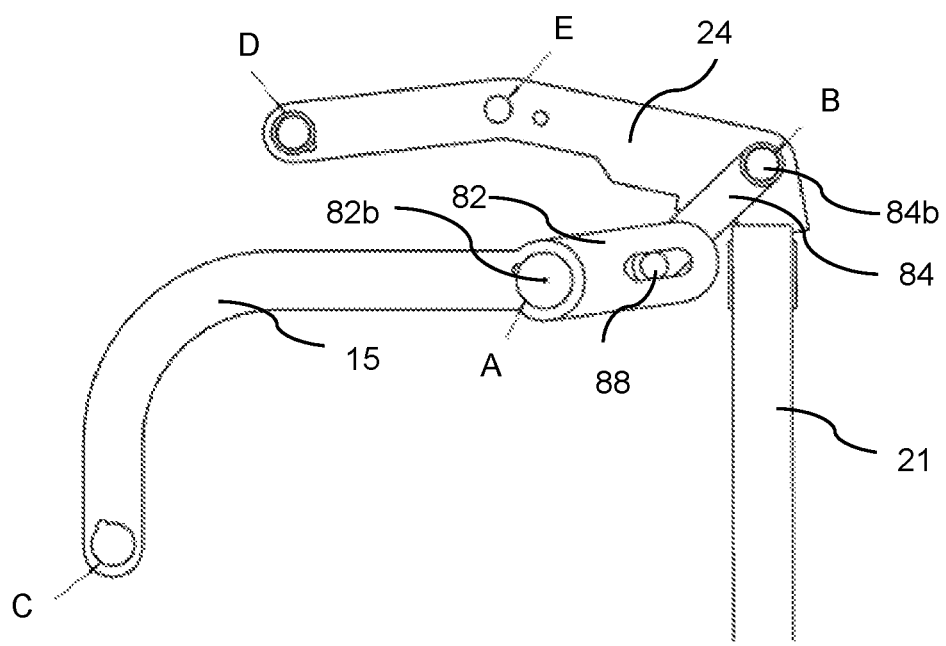
FIG. 10 is a side view that shows the closed shift fork connection structure in the ride-on toy according to the first embodiment.

FIG. 10 shows the closed shift fork connection structure 80 in the ride-on toy 100 of the first embodiment. According to the embodiment of FIG. 10, the open shift fork connection structure 80 replaces the rear connection of the pedal gear 16 and the rear leg gear 23 in the ride-on toy 100. Specifically, the first rotatable plate 82 is fixedly connected to the pedal push-pull rod 15 at the position A, and the second rotatable plate 84 is fixedly connected to the rear push-pull rod 24 at the position B. The rear push-pull rod 24 is fixedly connected to the rear leg 21. Further, a first pin 82b extends through the first hole 82a at the position A, and a second pin 84b extends through the second hole 84a.

Referring to FIG. 10, when the rear leg push-pull rod 24 is pushed by a downward force at positions D and E transferred from the handle 1 and the saddle 25, the rear leg 21 fixed to the rear leg push-pull rod 24 rotates about the second pin 84b at the position B in a counter clockwise direction. In other words, the rear leg 21 moves away from the front leg 9. At the same time, the second plate 84 pushes the first plate 82 downward via the pin 88 to cause the pedal push-pull rod 15 to rotate about the second pin 84b at the position B in a clockwise direction. Therefore, the position C where the pedal push-pull rod 15 is connected to the pedal bracket 14 is moved upward such that the pedal 13 is moved upward to provide an upward force to the rider's feet.

Further referring to FIG. 10, when the position C where the pedal push-pull rod 15 is connected to the pedal bracket 14 is moved by a downward force transferred from the pedal 13, the pedal push-pull rod 15 fixed to the first rotatable plate 82 rotates about the first pin 82b at the position A in the counter clockwise direction. At the same time, the first plate 82 pushes the second plate 84 upward via the pin 88 to cause the rear leg 21 to rotate about the second pin 84b at the position B in the clockwise direction. In other words, the rear leg 21 moves toward the front leg 9.

Figure 11:
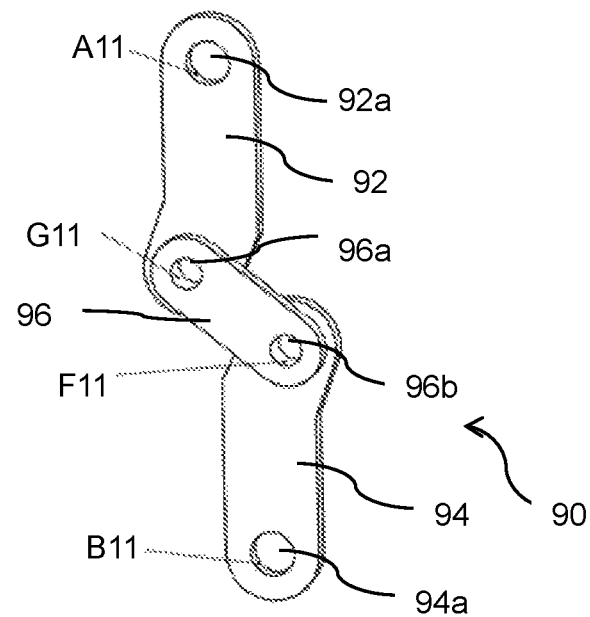
FIG. 11 is a perspective view that shows an example of a connection rod structure.

FIG. 11 shows an example of a connection rod structure 90. As shown in FIG. 11, the connection rod structure 90 includes a first rotatable plate 92 having a first hole 92a at the position A11, a second rotatable plate 94 having a second hole 94a at the position B11, and a connecting rod 96 having a pair of holes 96a and 96b. The connecting rod 96 is movably connected to the first and second rotatable plates 92 and 94 via pins (not shown) at the pair of holes 96a and 96b of the connecting rod 96 at the positions G11 and F11, respectively.

The first and second rotatable plates 92 and 94 are rotatable about the positions A11 and B11, respectively. When one of the first and second rotatable plates 92 and 94 rotates about the corresponding position in one direction, the other of the first and second rotatable plates 92 and 94 will be rotated in an opposite direction. When the first plate 92 rotates about the position A11 in a clockwise direction, the connecting rod 96 will move upward to cause the second rotatable plate 94 to rotate about the position B11 in a counter clockwise direction.

In one embodiment, the connection rod structure 90 can replace the front connection of the handle gear 3 and the front leg gear 7 in the ride-on toy 100 of the first embodiment or ride-on toy 200 of the second embodiment. Referring to FIGS. 1 and 11, the handle push-pull rod 2 of the handle unit can serve as the first rotatable plate 92 and include the first hole 92a at the position A11, and the front leg push-pull rod 6 of the front leg unit can serve as the second rotatable plate 94 and include the second hole 94a at the position B11.

Figure 12:
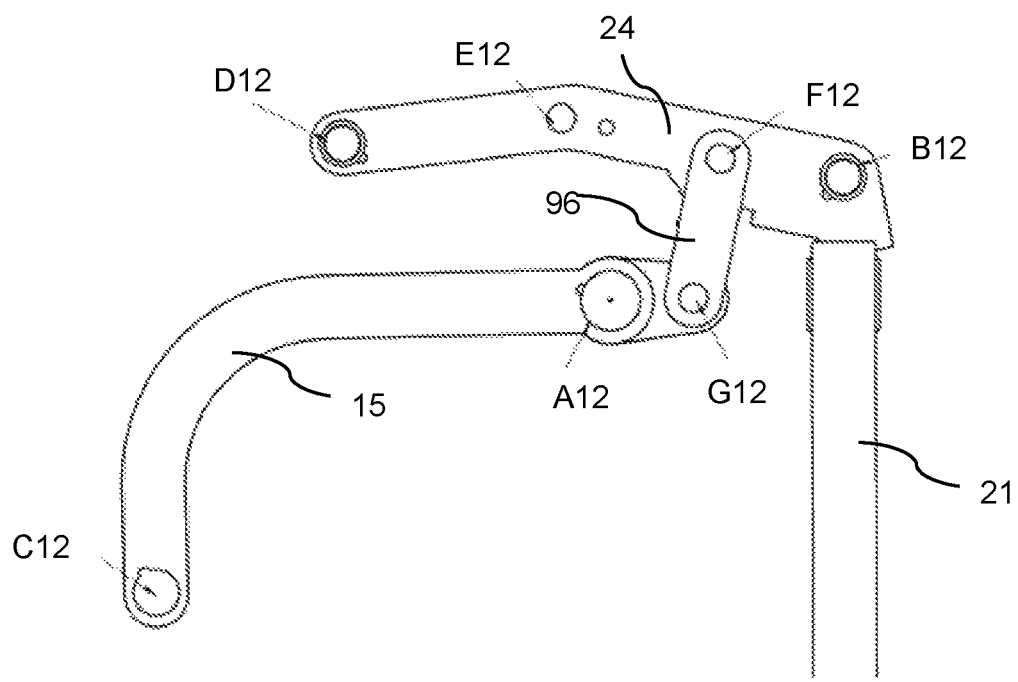
FIG. 12 is a side view that shows the connection rod structure in the ride-on toy according to the first embodiment.

FIG. 12 shows the connection rod structure 90 in the ride-on toy 100 of the first embodiment. According to the embodiment of FIG. 12, the open shift fork connection structure 90 replaces the rear connection of the pedal gear 16 and the rear leg gear 23 in the ride-on toy 100. Specifically, the rear leg push-pull rod 24 serves as the first rotatable plate 92 having the first hole 92a at the position A12, and the pedal push-pull rod 15 serves as the second rotatable plate 94 having the second hole 94a at the position B12. The connection rod 96 is connected to the rear leg push-pull rod 24 at the position F12 and is connected to the pedal push-pull rod 15 at the position G12.

Referring to FIG. 12, when the rear leg push-pull rod 24 is pushed by a downward force at positions D12 and E12 transferred from the handle 1 and the saddle 25, the rear leg 21 fixed to the rear leg push-pull rod 24 is rotated about the position B12 in a counter clockwise direction. In other words, the rear leg 21 moves away from the front leg 9. At the same time, the rear leg push-pull rod 24 pushes the connecting rod 96 downward to cause the pedal push-pull rod 15 to rotate about the position A12 in a clockwise direction. Therefore, the position C12 where the pedal push-pull rod 15 is connected to the pedal bracket 14 is moved upward such that the pedal 13 is moved upward to provide an upward force to the rider's feet.

Further referring to FIG. 12, when the position C12 where the pedal push-pull rod 15 is connected to the pedal bracket 14 is moved by a downward force transferred from the pedal 13, the pedal push-pull rod 15 rotates about the position A12 in the counter clockwise direction. At the same time, the connecting rod 96 is moved to push the rear leg push-pull rod 24 upward to cause the rear leg 21 to rotate about the position A12 in the clockwise direction. In other words, the rear leg 21 moves toward the front leg 9.

Figure 13:
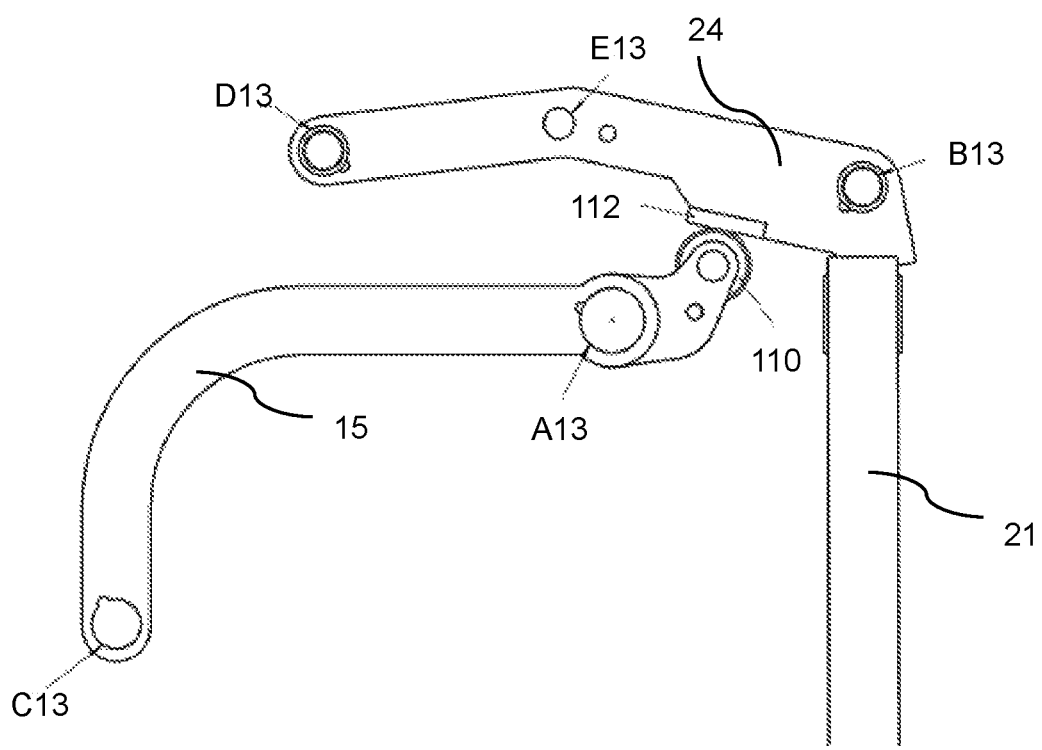
FIG. 13 is a side view that shows an example of a rolling type connection structure in the ride-on toy according to the first embodiment.

FIG. 13 shows an example of a rolling type structure in the ride-on toy 100 of the first embodiment. The rolling type structure includes a roller 110 mounted to one end of the pedal push-pull rod 15, and a plate 112 mounted to a lower surface of the rear leg push-pull rod 24. Referring to FIG. 13, when the rear leg push-pull rod 24 is pushed by a downward force at positions D13 and E13, the rear leg 21 fixed to the rear leg push-pull rod 24 rotates about the position B in a counter clockwise direction. At the same time, the plate 112 rolls to move downward against the roller 110 so that the pedal push-pull rod 15 is rotated about the position A13 in a clockwise direction. Therefore, the position C13 where the pedal push-pull rod 15 is connected to the pedal bracket 14 will be moved upward.

Further referring to FIG. 13, when the position C13 where the pedal push-pull rod 15 is connected to the pedal bracket 14 is moved by a downward force, the pedal push-pull rod 15 is rotated about the position A13 in the counter clockwise direction. At the same time, the roller 110 rolls to move upward against the plate 112 to push the leg push-pull rod 24 upward so as to cause the rear leg 21 to rotate about the position B13 in the clockwise direction.

Figure 14:
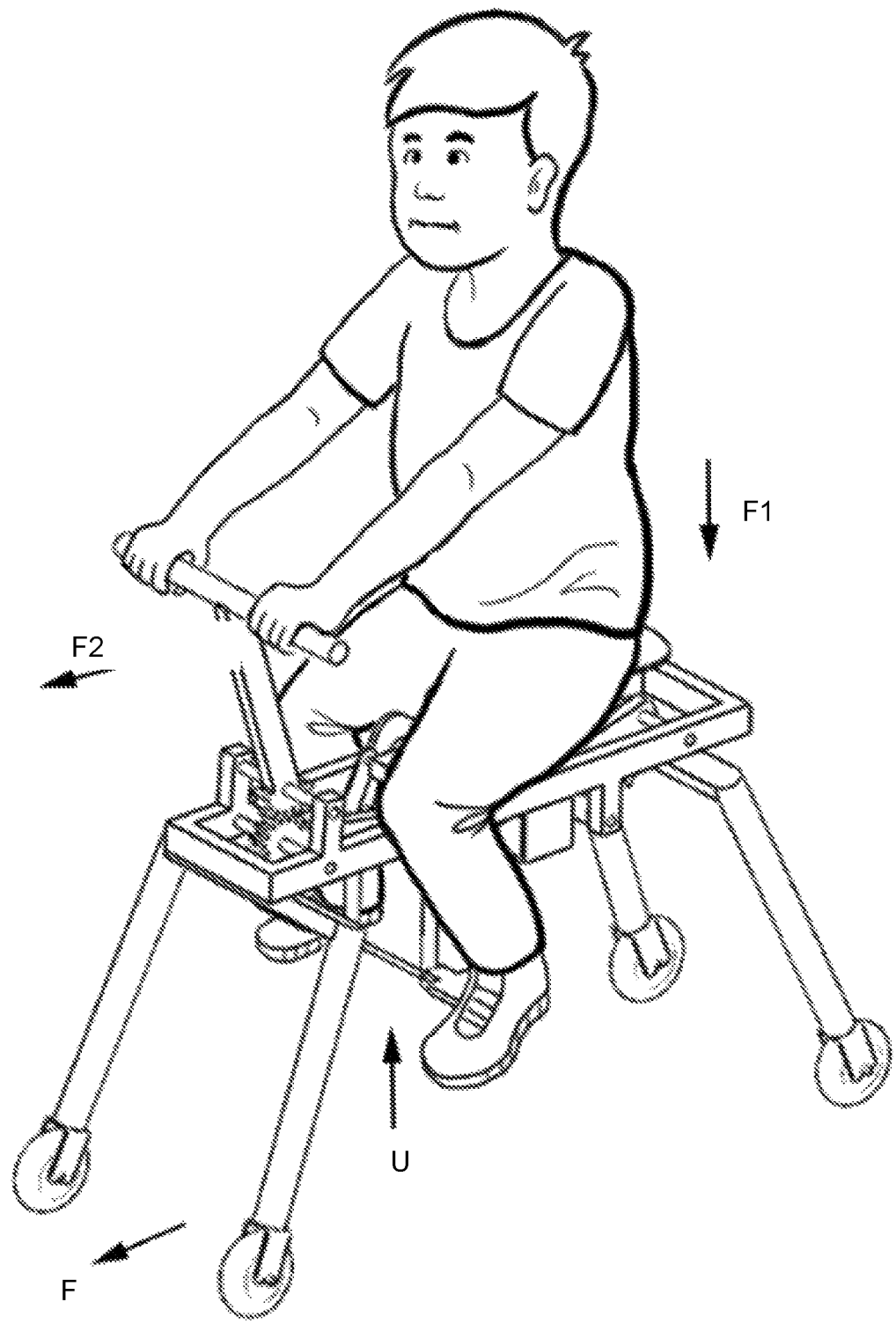
FIG. 14 is a perspective view that shows a first riding action when a rider rides on the ride-on toy according to the first embodiment.
Figure 15:
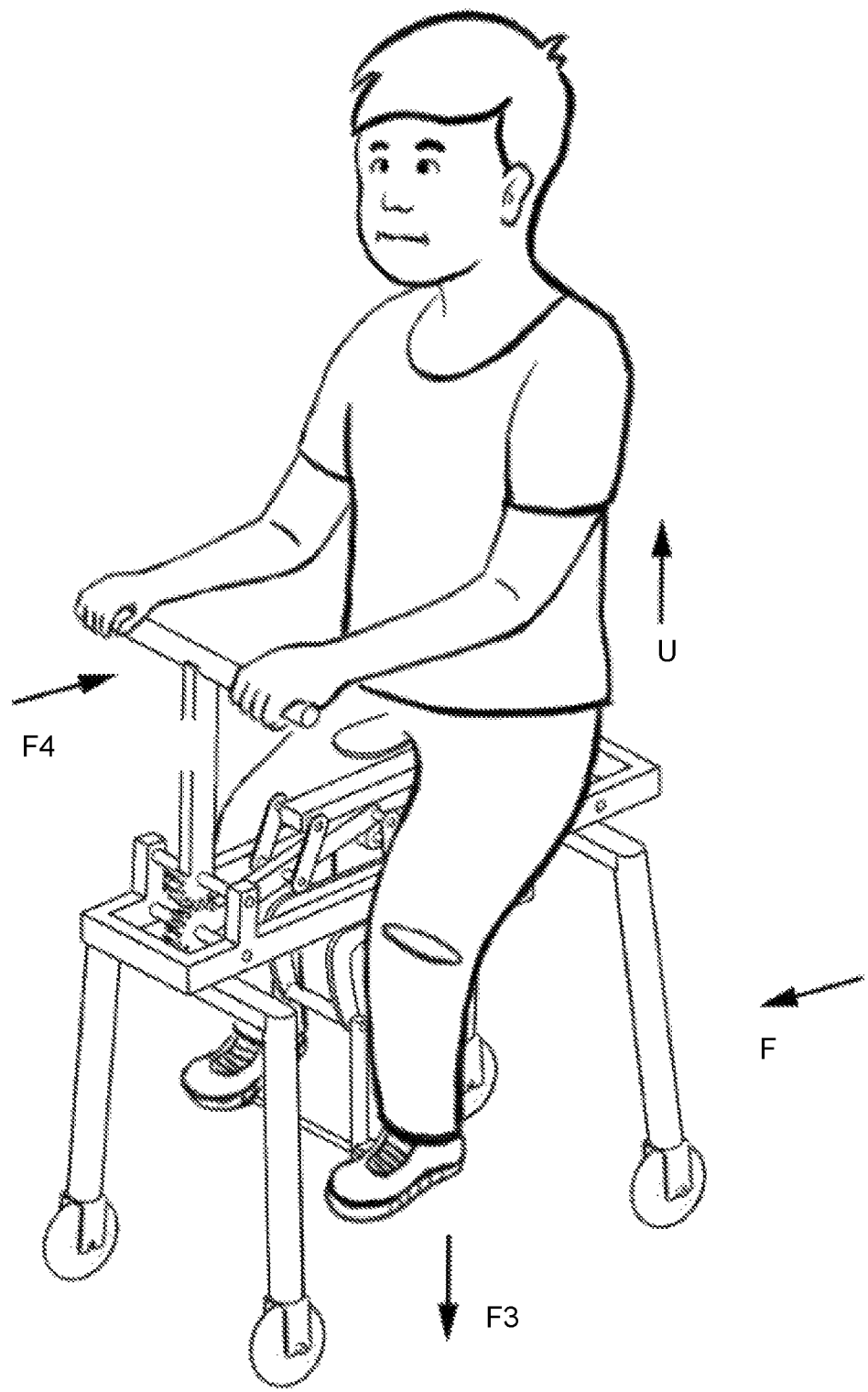
FIG. 15 is a perspective view that shows a second riding action when the rider rides on the ride-on toy according to the first embodiment.

FIGS. 14-15 illustrate first and second group of actions (or states) when a rider rides on the ride-on toy according to the above described embodiments.

In the first group of action (or state), when a rider sits on the saddle unit to press the saddle 25 downward by the gravity of the body of the rider and pushes the handle 1 forward and away from the body of the rider, while the rider's legs and feet are relaxed to not impose strain on the pedal 13, the pair of front legs 9 and the pair of rear legs 21 relatively move away from each other. Referring to FIGS. 8 and 14, the rear leg push-pull rod 24 is pushed by a downward force at the position E transferred from the saddle 25 by the first driving force F1 and at the position D transferred from the handle 1 by the second driving force F2, to cause the pair of rear legs 21 to attempt to rotate in the counter clockwise direction, i.e., move away from the pair of front legs 9, and to cause the pedal push-pull rod 15 to move upward, i.e., in the U direction. Further, at the same time, because all of the front wheels 11a and the rear wheels 11b are configured to rotate forward only, the pair of front legs 9 moves forward along with the front wheels 11a and away from the pair of rear legs 21, and the pair of rear legs 21 and the rear wheels 11b stay still.

In the second group of action (or state), when the rider pushes heavily on the pedals 13 to force the body to move upward and to tend to leave the saddle 25, at the same time, the rider's hand(s) pulls the handles 1 rearward and toward the body of the rider, the pair of front legs 9 and the pair of rear legs 21 relatively move toward each other. Referring to FIGS. 8 and 15, the pedal push-pull rod 15 is pushed by a downward force at the position C transferred from the pedal 13 by the third driving force F3 to cause the pair of rear legs 21 to rotate in the clockwise direction, e.g., move toward the pair of front legs 9. Further, at the same time, because all of the front wheels 11a and the rear wheels 11b are configured to rotate forward only, the pair of front legs 9 and the front wheels 11a stay still, and the pair of rear legs 21 moves forward and toward the pair of front legs 9 along with the rear wheels 11b.

The repeatedly performed first and second groups of action provide the rider a riding experience similar to a galloping of a real horse.

FIG. 14 illustrates the first group of action based on the first embodiment in more details. Specifically, referring to FIG. 14, when the rider rides on the ride-on toy 100, the rider's body will sit on the saddle 25, the rider's feet will step on the pedals 13 while the rider's legs and feet are relaxed to not strain the pedal 13. In this way, the weight of the rider is applied on the saddle 25 due to the gravity and forms a first driving force F1 to drive the saddle 25 to move downward. The first driving force F1 is applied to the front leg push-pull rod 6 and the rear leg push-pull rod 24 via the saddle bracket 26 and the connection block 27 connecting the front leg unit and the saddle unit to push the pair of front legs 9 and the pair of rear legs 21 relatively away from each other. At the same time, the rider's hand(s) pushes the handle 1 forward and away from the body of the rider. Such pushing forms a second driving force F2 to cause the pair of front legs 9 to have a tendency to move forward via the handle push-pull rod 2 and the engagement of the handle gear 3 and front leg gear 7. The second driving force F2 further causes the pair of rear legs 21 to tend to move rearward due to the connection block 17 which connects the front leg push-pull rod 6 and the rear leg push-pull rod 24. At the same time, the pedal 13 is moved by upward in the U direction.

The front and rear wheels 11a and 11b on the pair of front legs 9 and the pair of rear legs 21 can rotate forward only. Thus, when the pair of front legs 9 is driven by the first and second driving forces to tend to move forward and the pair of rear legs 21 is driven by the first and second driving forces F1 and F2 to move rearward, the front wheels 11a drive the pair of front legs 9 forward in the F direction while the rear wheels 11b on the pair of rear leg 21 do not move relative to the ground. As a result, when the rider rides on the ride-on toy 100, the rider's gravity (first driving force F1), the force (second driving force F2) applied to the handle 1, and the force generated by friction of the front and rear wheels 11a and 11b with the ground all cause the ride-on toy 100 to move forward by the first group of action where the pair of front legs 9 is moved forward while the pair of rear legs 21 remains in place and does not move relative to the ground. At the same time, the rider's body is lowered along with the saddle 25 relative to the ground.

FIG. 15 illustrates the second group of action based on the first embodiment. Specifically, referring to FIG. 12, after the first group of action is completed, the rider's feet push on the pedal 13 to push the rider to stand upward and away from the saddle 25. The force pushing on the pedals 13 forms a third driving force F3 which passes to the pedal gear 16 from the pedal 13 through the pedal bracket 14 and the pedal push-pull rod 15, and then the engagement of the front gear 16 and the rear gear 23 so as to drive the pair of rear legs 21 to move forward in the F direction.

Since the front leg push-pull rod 6 and the rear leg push-pull rod 24 are connected by the connection block 17, the third driving force F3 also causes the pair of front legs 9 to tend to move toward and the pair of rear legs 21. At the same time, the rider's hand(s) pulls the handle 1 rearward and toward the body of the rider to form a fourth driving force F4. The fourth driving force F4 causes the pair of front legs 9 to tend to move rearward by the engagement of the handle gear 3 and the front leg gear 7, as the front leg push-pull rod 6 and the rear leg push-pull rod 24 are connected by the connection block 17. Therefore, the pair of front legs 9 and the pair of rear legs 21 move relatively toward each other by the fourth driving force F4. At the same time, the saddle 25 is moved upward in the U direction.

The front and rear wheels 11a and 11b mounted to the corresponding front legs 9 and rear legs 21 can only rotate forward. Thus, when the pair of front legs 9 is driven by the third and fourth driving forces F3 and F4 to tend to move rearward and the pair of rear legs 21 is driven by the third and fourth driving forces F3 and F4 to move forward, the rear wheels 11b drives the pair of rear legs 21 forward while the front wheels 11a on the pair of front legs 9 stay still and do not move relative to the ground. As a result, when the rider rides on the ride-on toy 100, the downward force (the third driving force F3) applied to the pedal 13, the rearward force (the fourth driving force F4) applied to the handle 1, and the force caused by the friction between the front and rear wheels and the ground all drive the ride-on toy 100 to move forward by the second group of action where the pair of rear legs 21 is moved forward while the pair of front legs 9 remain in place and does not move relative to the ground. At the same time, the rider's body rises along with the saddle relative to the ground.

According to the first embodiment described in relation to FIGS. 1-3, the ride-on toy 100 is configured to move forward through both forward and rearward drive. The forward drive is achieved by the front leg gear 7 and the handle gear 3, and the rearward drive is achieved by the pedal gear 16 and the rear leg gear 23.

According to the second embodiment described in relation to FIGS. 4-6, the ride-on toy 200 is configured to move forward through forward drive only. Specifically, the ride-on toy 200 includes the drive connection rod 29 connected to the handle push-pull rod 2 and the pedal bracket 14. The force applied by the rider's feet on the pedal 13 is transferred to the handle push-pull rod 2 through the drive connection rod 29 to achieve the forward drive. The forward drive is further achieved by the front leg gear 7 and the handle gear 3.

According to the ride-on toy described above, the repeatedly performed first and second groups of action can cause the front and rear legs to move relatively toward and away from each other so as to provide the rider a riding experience similar to a galloping of a real horse. Further, in some embodiments, the ride-on toy can be designed to different sizes according to the rider. In some embodiments, the ride-on toy can be covered with soft fur similar to a horse, lion, tiger, giraffe, zebra, elephant, cow, sheep, or other animals for providing the riders more entertainment.

In some embodiments, the handle unit and the front leg unit are configured as a steering device as described in US patent application titled "Steering Device," Ser. No. 15/990,040, invented by Tianfang LING, which application is incorporated by reference herein.

In accordance with one embodiment, a ride-on toy includes a handle unit; a front leg unit movably connected to the handle unit via a front connection, and including a front leg and a front wheel mounted to the front leg; a rear leg unit movably connected to the front leg unit, and including a rear leg and a rear wheel mounted to the rear leg; a pedal unit movably connected to the rear leg unit via a rear connection; a saddle unit movably connected to the front leg unit; and a chassis movably connected to the handle unit, the front leg unit, the pedal unit, the rear leg unit, and the saddle unit. In a first state, in response to a first downward force applied to the saddle unit and a forward force applied to the handle unit, the front leg moves with the front wheel forward and away from the rear leg, and the rear leg stays still. In a second state, in response to a second downward force applied to the pedal unit and a rearward force applied to the handle unit, the rear leg moves with the rear wheel forward and toward the front leg, and the front leg stays still.

In accordance with another embodiment, a ride-on toy includes a handle unit; a front leg unit movably connected to the handle unit via a first connection, and including a front leg and a front wheel mounted to the front leg; a rear leg unit movably connected to the front leg unit, and including a rear leg and a rear wheel mounted to the rear leg; a pedal unit movably connected to the handle unit via a second connection; a saddle unit movably connected to the front leg unit; and a chassis movably connected to the handle unit, the front leg unit, the pedal unit, the rear leg unit, and the saddle unit. In a first state, in response to a first downward force applied to the saddle unit and a forward force applied to the handle unit, the front leg moves with the front wheel forward and away from the rear leg, and the rear leg stays still. In a second state, in response to a second downward force applied to the pedal unit and a rearward force applied to the handle unit, the rear leg moves with the rear wheel forward and toward the front leg, and the front leg stays still.

In accordance with another embodiment, a ride-on toy includes a handle, a handle gear, and a handle push-pull rod fixedly connecting the handle and the handle gear; a front leg, a front leg gear, and a front leg push-pull rod fixedly connecting the front leg and the front leg gear; a front wheel mounted to the front leg; a pedal and a pedal push-pull rod connected to the pedal; a rear leg and a rear leg push-pull rod fixedly connected to the rear leg; a rear wheel mounted to the rear leg; a saddle and a saddle bracket fixedly connected to the saddle; and a chassis movably connected to the handle, the front leg, the pedal, the rear leg, and the saddle. The front leg is movably connected to the handle via a first connection, the pedal is movably connected to, the handle or the rear leg, via a second connection, the front leg push-pull rod is connected to the saddle bracket by a connection block, the front leg push-pull rod is connected to the rear leg push-pull rod by a further connection block, and the front and rear wheels each include a stop mechanism to cause the front and rear wheels to rotate forward only.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A ride-on toy, comprising:
a handle unit;
a front leg unit movably connected to the handle unit via a front connection, and including a front leg and a front wheel mounted to the front leg;
a rear leg unit movably connected to the front leg unit, and including a rear leg and a rear wheel mounted to the rear leg;
a pedal unit movably connected to the rear leg unit via a rear connection;
a saddle unit movably connected to the front leg unit; and
a chassis movably connected to the handle unit, the front leg unit, the pedal unit, the rear leg unit, and the saddle unit,
wherein
in a first state, in response to a first downward force applied to the saddle unit and a forward force applied to the handle unit, the front leg moves with the front wheel forward and away from the rear leg, and the rear leg stays still, and
in a second state, in response to a second downward force applied to the pedal unit and a rearward force applied to the handle unit, the rear leg moves with the rear wheel forward and toward the front leg, and the front leg stays still.

2. The ride-on toy according to claim 1, wherein the front and rear wheels are configured to rotate forward only.

3. The ride-on toy according to claim 1, wherein the handle unit includes a handle, a handle gear, and a handle push-pull rod fixedly connecting the handle and the handle gear,
the front leg unit includes a front leg gear, and a front leg push-pull rod fixedly connecting the front leg gear and the front leg, and
the handle gear engages with the front leg gear to define the front connection.

4. The ride-on toy according to claim 1, wherein the pedal unit includes a pedal, a pedal gear, and a pedal push-pull rod fixedly connecting the pedal and the pedal gear,
the rear leg unit further includes a rear leg gear, and a rear leg push-pull rod fixedly connecting the rear leg gear and the rear leg, and
the pedal gear engages with the rear leg gear to define the rear connection.

5. The ride-on toy according to claim 1, wherein the saddle unit includes a saddle, and a saddle bracket fixedly connected to the saddle,
the rear leg unit further includes a rear leg push-pull rod fixedly connected to the rear leg,
the front leg push-pull rod is connected to the saddle bracket by a connection block, and
the front leg push-pull rod is connected to the rear leg push-pull rod by a further connection block.

6. The ride-on toy according to claim 1, wherein the ride-on toy is configured to move forward through forward drive only, in the first state,
when the first downward force is applied to a saddle of the saddle unit, the first downward force is transferred from the saddle to the front leg via a connection block and from the front leg to the rear leg via a further connection block to cause the front leg and the rear leg to move relatively away from each other,
when the forward force is applied to a handle of the handle unit, the forward force is transferred from the handle to the front leg via the front connection and from the front leg to the rear leg via the further connection block to cause the front leg and the rear leg to move relatively away from each other, and
in response to the first downward force and the forward force transferred to the rear leg via the further connection block, the rear wheel is configured to prevent the rear leg from moving relative to a ground, and in the second state,
when the second downward force is applied to a pedal of the pedal unit, the second downward force is transferred from the pedal to the rear leg via the rear connection and from the rear leg to the front leg via the further connection block to cause the front leg and the rear leg to move relatively toward from each other,
when the rearward force is applied to the handle of the handle unit, the rearward force is transferred from the handle to the front leg via the front connection and from the front leg to the rear leg via the further connection block to cause the front leg and the rear leg to move relatively toward each other, and
in response to the rearward force and the second downward force transferred to the front leg via the further connection block, the front wheel is configured to prevent the front leg from moving relative to the ground.

7. The ride-on toy according to claim 1, wherein the pedal unit includes a pedal push-pull rod,
the chassis includes an upper bracket,
a handle push-pull rod is movably connected to the upper bracket of the chassis,
the chassis includes a first lower bracket and a second lower bracket,
the pedal push-pull rod of the pedal unit is movably connected to the first lower bracket of the chassis and disposed above the second lower bracket, and
the second lower bracket is configured to limit a movement of the pedal push-pull rod.

8. The ride-on toy according to claim 1, wherein the saddle unit includes
a saddle bracket, and
a spring between the saddle bracket and a lower bracket of the chassis, and biasing the saddle bracket away from the lower bracket.

9. The ride-on toy according to claim 1, wherein the front and rear wheels each include a stop mechanism to cause the front and rear wheels to rotate forward only.

10. The ride-on toy according to claim 1, wherein the front connection is a rotational connection in which the handle unit is rotatably connected to the front leg unit, and the rear connection is a further rotational connection in which the pedal unit is rotatably connected to the rear leg unit.

11. A ride-on toy, comprising:
a handle unit;
a front leg unit movably connected to the handle unit via a first connection, and including a front leg and a front wheel mounted to the front leg;
a rear leg unit movably connected to the front leg unit, and including a rear leg and a rear wheel mounted to the rear leg;
a pedal unit movably connected to the handle unit via a second connection;
a saddle unit movably connected to the front leg unit; and
a chassis movably connected to the handle unit, the front leg unit, the pedal unit, the rear leg unit, and the saddle unit,
wherein
in a first state, in response to a first downward force applied to the saddle unit and a forward force applied to the handle unit, the front leg moves with the front wheel forward and away from the rear leg, and the rear leg stays still, and
in a second state, in response to a second downward force applied to the pedal unit and a rearward force applied to the handle unit, the rear leg moves with the rear wheel forward and toward the front leg, and the front leg stays still.

12. The ride-on toy according to claim 11, wherein
the front and rear wheels are configured to rotate forward only.

13. The ride-on toy according to claim 11, wherein
the handle unit includes a handle, a handle gear, a handle push-pull rod fixedly connecting the handle and the handle gear, and a drive connection rod connecting the handle push-pull rod and the pedal unit,
the front leg unit includes a front leg gear, and a front leg push-pull rod connecting the front leg gear and the front leg, and
the handle gear engages with the front leg gear to define the first connection.

14. The ride-on toy according to claim 11, wherein
the rear leg unit further includes a rear leg gear, and a rear leg push-pull rod fixedly connecting the rear leg gear and the rear leg,
the pedal unit includes a pedal, and a pedal bracket connected to the pedal, and
a drive connection rod of the handle unit and the pedal bracket are movably connected to each other to define the second connection.

15. The ride-on toy according to claim 11, wherein
the saddle unit includes a saddle, and a saddle bracket fixedly connected to the saddle,
a front leg push-pull rod of the front leg unit is connected to the saddle bracket by a connection block, and
the front leg push-pull rod is connected to a rear leg push-pull rod of the rear leg unit by a further connection block.

16. The ride-on toy according to claim 11, wherein
in the first state,
when the first downward force is applied to a saddle of the saddle unit, the first downward force is transferred from the saddle to the front leg via a connection block and from the front leg to the rear leg via a further connection block to cause the front leg and the rear leg to move relatively away from each other,
when the forward force is applied to a handle of the handle unit, the forward force is transferred from the handle to the front leg via the first connection and from the front leg to the rear leg via the further connection block to cause the front leg and the rear leg to move relatively away from each other, and
in response to the first downward force and the forward force transferred to the rear leg via the further connection block, the rear wheel is configured to prevent the rear leg from moving relative to a ground, and
in the second state,
when the second downward force is applied to a pedal of the pedal unit, the second downward force is transferred from the pedal to the handle unit via the second connection, from the handle unit to the front leg via the first connection, and from the front leg to the rear leg from the further connection block to cause the front leg and the rear leg to move relatively toward each other, and
when the rearward force is applied to the handle of the handle unit, the rearward force is transferred from the handle to the front leg via the first connection and from the front leg to the rear leg via the further connection block to cause the front leg and the rear leg to move relatively toward each other, and
in response to the rearward force and the second downward force transferred to the front leg via the further connection block, the front wheel is configured to prevent the front leg from moving relative to the ground.

17. The ride-on toy according to claim 11, wherein the chassis includes
an upper bracket connected to the handle unit, and
a lower bracket disposed below a rear leg push-pull rod of the rear leg unit to limit a movement of the rear leg push-pull rod.

18. The ride-on toy according to claim 11, wherein
the saddle unit includes
a saddle bracket, and
a spring between the saddle bracket and a lower bracket of the chassis, and biasing the saddle bracket away from the lower bracket.

19. The ride-on toy according to claim 11, wherein
the front and rear wheels each include a stop mechanism to cause the front and rear wheels to rotate forward only.

20. The ride-on toy according to claim 11, wherein
the first connection is a rotational connection in which the handle unit is rotatably connected to the front leg unit, and
the second connection is a further rotational connection in which the handle unit is rotatably connected to the pedal unit.

21. A ride-on toy, comprising:
a handle, a handle gear, and a handle push-pull rod fixedly connecting the handle and the handle gear;
a front leg, a front leg gear, and a front leg push-pull rod fixedly connecting the front leg and the front leg gear;
a front wheel mounted to the front leg;
a pedal and a pedal push-pull rod connected to the pedal;
a rear leg and a rear leg push-pull rod fixedly connected to the rear leg;
a rear wheel mounted to the rear leg;
a saddle and a saddle bracket fixedly connected to the saddle; and a chassis movably connected to the handle, the front leg, the pedal, the rear leg, and the saddle, wherein the front leg is movably connected to the handle via a first connection, the pedal is movably connected to, the handle or the rear leg, via a second connection, the front leg push-pull rod is connected to the saddle bracket by a connection block, the front leg push-pull rod is connected to the rear leg push-pull rod by a further connection block, and the front and rear wheels each include a stop mechanism to cause the front and rear wheels to rotate forward only.

* * * * *